United States Patent [19]

Späth et al.

[11] 4,368,522
[45] Jan. 11, 1983

[54] METHOD OF MEASURING ERRORS IN THE TRUTH OF ROTATION OF A GEAR

[75] Inventors: Hans Späth, Kloten; Meinrad Donner, Nuolen, both of Switzerland

[73] Assignee: Maag Gear-Wheel & Machine Co. Ltd., Zurich, Switzerland

[21] Appl. No.: 187,598

[22] Filed: Sep. 15, 1980

[30] Foreign Application Priority Data

Oct. 5, 1979 [CH] Switzerland ............... 8990/79

[51] Int. Cl.³ ............................................. G06F 15/36
[52] U.S. Cl. ................................. 364/550; 364/507; 364/575; 235/92 MP
[58] Field of Search ................. 364/550–552, 364/554, 556, 559, 570, 571, 575, 734, 507; 235/92 MP

[56] References Cited

U.S. PATENT DOCUMENTS

| | | | |
|---|---|---|---|
| 3,557,354 | 1/1971 | Trimble | 364/734 |
| 3,866,829 | 2/1975 | Egawa et al. | 364/551 |
| 3,875,383 | 4/1975 | Somerville et al. | 364/575 |
| 4,144,578 | 3/1979 | Mueller et al. | 364/575 |
| 4,223,681 | 9/1980 | Sherman | 364/575 |

*Primary Examiner*—Gary Chin
*Attorney, Agent, or Firm*—Werner W. Kleeman

[57] ABSTRACT

A method of measuring errors in the rotational truth of gear teeth of a gear by means of a measuring device having a feeler guide which is pivotable about a pivot axis parallel to the gear axis, the feeler guide guiding a feeler which is prebiased in the direction of the gear and cyclically engages into the gear teeth as the gear rotates. The feeler together with the feeler guide is pivotable about its pivot axis and can be displaced back in relation to the feeler guide. An electronic circuit determines the largest degree of rearward displacement of the feeler during each measuring cycle in that it stores signals delivered by the feeler and compares such stored signals with one another. During each measuring cycle there is formed from a number of signals delivered by the feeler as well as from a number of subsequently delivered signals a respective mean value. Both mean values are compared with one another, the larger of such mean values, to the extent that it constitutes the mean value of the later signals is stored, and this procedure is repeated for such length of time until there is present a mean value which is smaller than the directly previously formed mean value, whereupon such previously formed mean value is delivered as the maximum value of the related measuring cycle.

2 Claims, 4 Drawing Figures

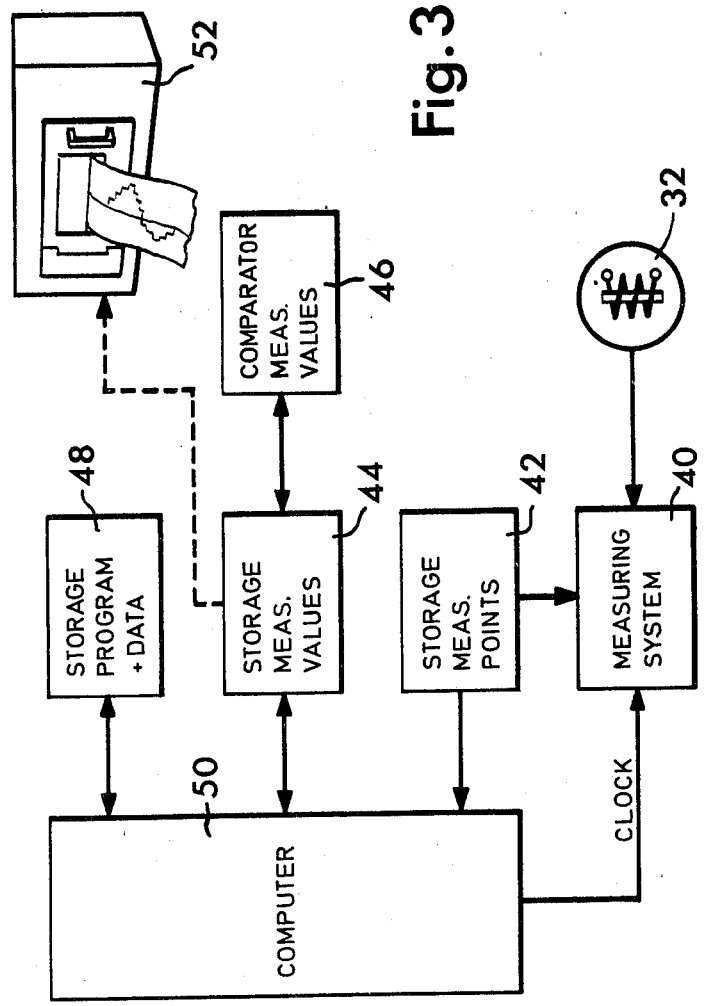

METHOD OF MEASURING ERRORS IN THE TRUTH OF ROTATION OF A GEAR

BACKGROUND OF THE INVENTION

The present invention relates to a new and improved method of measuring errors in the truth of rotation of a gear.

Generally speaking, the method of measuring the rotational truth errors of gear teeth of a gear employs a measuring device having a feeler guide which is pivotable about a pivot axis disposed essentially parallel to the gear axis. The feeler guide guides a feeler which is pre-biased in the direction of the gear, cyclically engages into the gear teeth during such time as the gear rotates, and the feeler together with the feeler guide is pivoted about its pivot axis and forced or displaced back in relation to the feeler guide. Further, an electronic circuit determines, during each measuring cycle, the greatest degree of rearward displacement of the feeler in that it stores signals delivered by the feeler and compares the stored signals with one another.

With the present day high requirements placed upon the precision or accuracy of gear teeth of the most different types of gears, it is particularly important that cutting gears and other toothed tools, for fabricating such gear teeth, be machined extremely accurately. This requirement, among other things, makes it important that there be extremely accurately measured errors in the rotational truth of cutting gear teeth, so that they can be subsequently corrected as the need arises. Exact measurements of the rotational truth of gear teeth also must be carried out at standard gears which are not used as cutting gears and at gears which at the present time possess the greatest attainable diameters and number of teeth. Therefore, the need has existed for quite some time to measure the rotational truth of gears not only with utmost accuracy, but also with the least amount of time. The last-mentioned requirement means that it is desirable to be able to carry out the measurement at the highest possible rotational speed of the gear which is to be measured.

With all of the heretofore known equipment for performing the initially described method, there occurs between the feeler and the tooth flanks against which the feeler bears, due to the rotation of the gear, a rolling or generating movement upon which there is superimposed a sliding relative movement. The sliding relative movement is opposed by frictional forces which, within each measuring cycle, are appreciable, and often can periodically fluctuate. Consequently, the feeler is caused to oscillate. The amplitude of such oscillations, particularly at high rotational speeds of the gear, can assume an order of magnitude at which it is no longer immaterial during which oscillation phase there is obtained a measurement value for the largest rearward displacement of the feeler within each measuring cycle.

However, the heretofore methods do not take into account these factors in any way at all, nor do the measuring devices which have been proposed for the performance of such methods, and thus, reliable measurement results only can be obtained with such known methods and equipment, if at all, under the prerequisite that the measurements are carried out at low circumferential speeds of the gear teeth. Efforts to dampen the described oscillations in a manner such that the initially described method also can be employed for delivering sufficiently accurate measurements results, even during the measuring of gear teeth where the gears rotate at high circumferential or peripheral velocities, up to the present have not been very successful.

SUMMARY OF THE INVENTION

Therefore, with the foregoing in mind it is a primary object of the present invention to provide a new and improved method of measuring errors in the truth of rotation of a gear in a manner not associated with the aforementioned drawbacks and limitations of the prior art proposals.

Another and more specific object of the present invention aims at improving upon the method of the previously described species in such a manner that oscillations of the feeler are not incorporated into the measurement result or at the very worst only within permissible boundaries.

Now in order to implement these and still further objects of the invention, which will become more readily apparent as the description proceeds, the method of the present development is manifested by the features that during each measuring cycle there is formed from a plurality of the signals delivered by the feeler as well as from a plurality of subsequently delivered signals a respective mean or average value. Both of the mean values are compared with one another, the larger one of the mean values, to the extent that it constitutes the mean value of the later signals, is stored, and this procedure is repeated for such length of time until there is formed a mean value which is smaller than the directly preceeding formed mean value. Thereafter, this previously formed mean value is delivered as the maximum value of the related measuring cycle.

The frequency of the basically undesired oscillations of the feeler, which however cannot be avoided for the stated reasons, is either known or can be easily determined. Therefore, it is also easily possible to ascertain at what period of time the electronic circuit has recalled signals of the feeler and from how many such signals such electronic circuit, in each case, has formed a mean value, so that this mean value completely or at least essentially is unaffected by oscillations of the feeler. Additionally, in each individual case, with a given circumferential velocity of the measured gear teeth, it is readily possible to compute the time intervals when there must be formed mean values, so that the method is carried out within the desired measuring accuracy, if there is considered the largest mean value, formed within a measuring cycle, as the measurement value for the largest forcing or displacement back of the feeler within such measuring cycle.

The inventive method is preferably carried out in a manner such that the first mean value is formed from 2n-signals, the second mean value from the second half of such 2n-signals as well as from n-subsequent signals, the third mean value is formed from such n-subsequent signals and further n-signals which are still later and so forth. Consequently, there is realized the greatest possible measuring accuracy for a given number n of the signals within each individual group of signals as well as with a given time interval between each two respective groups of signals.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a block circuit diagram of the electronic circuitry belonging to the measuring device of FIG. 1.

DETAILED DESCRIPTION OF THE PREFERRED EMBODIMENTS

Figure 1:
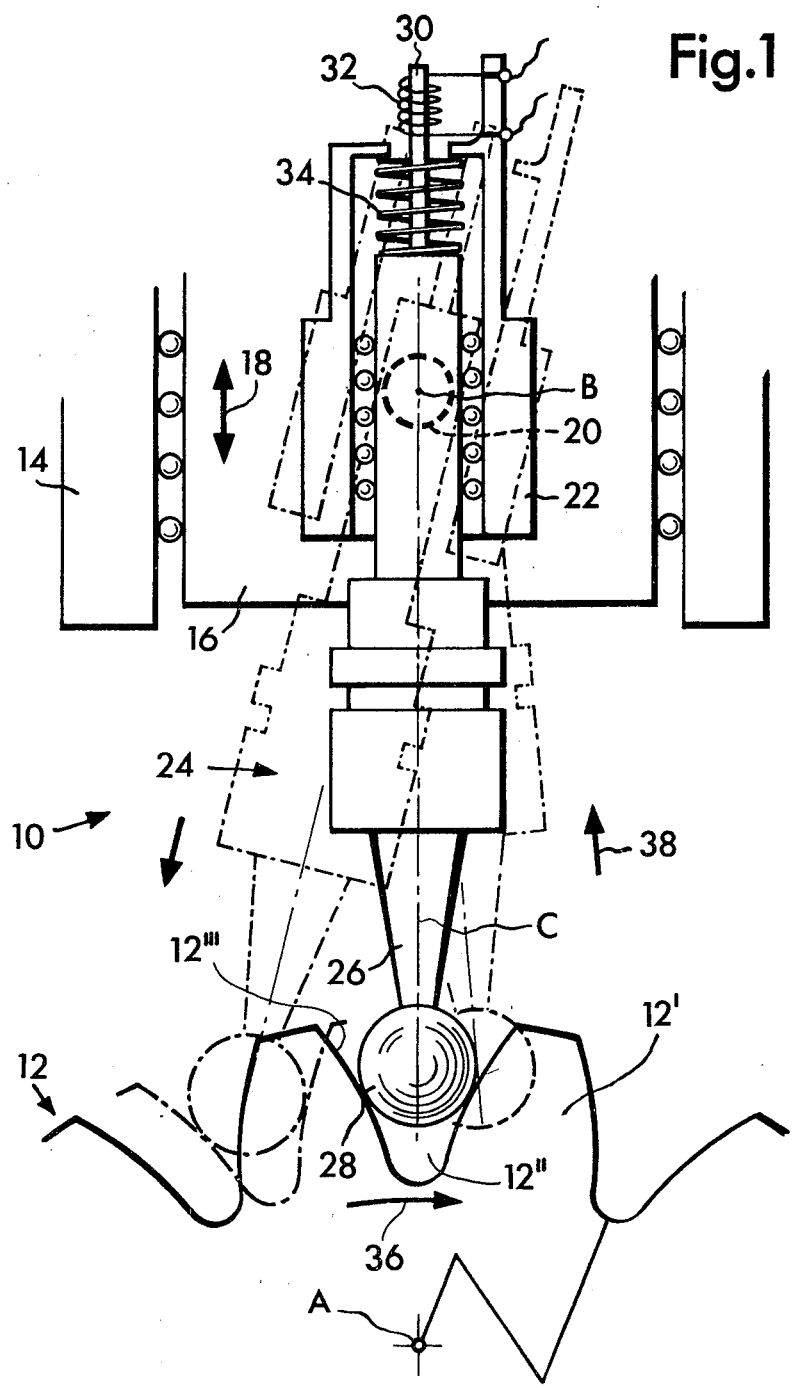
FIG. 1 is a fragmentary view of a measuring device shown in top plan view which can be employed for carrying out the inventive method.

Describing now the drawing, in FIG. 1 there is partially illustrated a measuring device or apparatus 10 which is assigned the task of measuring errors in the truth of rotation at the gear teeth 12′ of a gear 12 which has been clamped or chucked at a not particularly illustrated, rotatably drivable chucking or clamping device of any random type of conventional gear machining or gear testing machine.

Belonging to the measuring device 10 is a slide guide 14 which is stationarily arranged at a stationary part, for instance the machine table, of the aforementioned machine and, if necessary, can be fixedly clamped. The slide or carriage guide 14 extends at least approximately radially with respect to the gear 12 and carries a slide or carriage 16 which can be advanced and retracted by means of any suitable drive, as is well known in this technology, in the direction of the double-headed arrow 18. At the slide 16 there is attached a pivot pin 20 which extends parallel to the axis A of the gear 12 and perpendicular to the plane of the drawing of FIG. 1. The geometric axis of the pivot pin 20 will be designated hereinafter as the pivot axis B. Upon the pivot pin 20 there is pivotably mounted a feeler guide 22.

Displaceably guided within the feeler guide 22 is a feeler 24 for movement along a feeler axis C. The feeler axis C intersects the pivot axis B at a right angle, and thus, is located in every random position of the feeler guide 22 in a plane which is perpendicular to the axis A of the gear 12.

The feeler 24 has an exchangeable insert or insert element 26 which, in the illustrated embodiment, possesses a spherical-shaped or ball-like head 28 and engages by means of such ball-like head 28 into a tooth gap 12″ of the gear 12 in a manner such that the head 28 bears against two oppositely located tooth flanks 12′′′. Instead of using the insert element or member 26 the feeler or feeler member 24 could possess a fork-shaped or bifurcated insert, which during each measuring cycle engages over a tooth and bears on both of its two flanks which face away from one another.

The feeler or feeler member 24 is provided at its end which faces away from the insert member 26 with a rod 30 extending along the length of the feeler axis C. This rod 30 immerses into a moving coil 32 and together therewith forms an electro-inductive measuring value transmitter.

Arranged to extend completely about the rod or rod member 30 is a helical compression or pressure spring 34 which is clamped between the feeler guide 22 and the feeler 24 in such a manner that it strives to displace the feeler in the direction of the gear 12, and thus, maintains the feeler 24 in engagement or contact with the gear 12.

The slide or carriage 16 can be moved away from the gear 12, by means of any suitable and therefore not particularly illustrated drive which is preferably controlled by the feeler 24, to such an extent that the feeler 24 and its head 28 is freed from the gear teeth. As soon as this condition has been reached, the feeler guide 22, for instance under the action of a not particularly illustrated spring which pre-biases such in the clockwise direction, pivots into an impact or stop position which has been indicated in FIG. 1 with phantom lines. If the slide or carriage 16 is now again displaced in the direction of the axis A of the gear 12, then the feeler 24 together with its feeler head 28, as likewise indicated with broken or phantom lines, immerses into that tooth gap of the gear 12 which is now used for the next measuring cycle. The gear 12 rotates at a continuously constant velocity in the direction of the arrow 36, and thus, entrains the head 28, so that, on the one hand, the feeler 24 together with the feeler guide 22 can be rocked about the pivot axis B opposite to the clockwise direction, and, on the other hand, the feeler 24 is forced back in the direction of the arrow 38 with respect to the feeler guide 22. The feeler 24 has been shown in FIG. 1 in full or solid lines in that position where it has been forced back to its greatest extent; in this position the feeler axis C intersects the axis A of the gear 12. The magnitude of the largest rearward displacement of the feeler 24, notwithstanding great rotational velocities of the gear 12, should be measured as accurately as possible as if the gear and feeler were stationary in this position.

Past the position indicated with full or solid lines the feeler 24 follows the gear 12 for still a relatively small path, until it has reached the position indicated with broken lines. During the movement along this path the magnitude through which the gear 12 forces back or rearwardly displaces the feeler 24 in relation to the feeler guide 22 gradually again decreases.

Figure 2A:
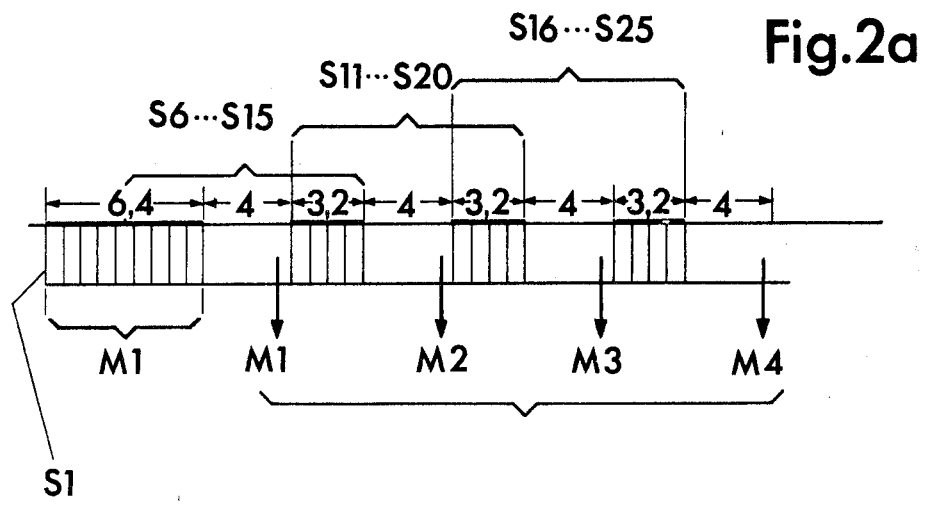
FIG. 2a illustrates the course as a function of time of a number of measurements and mean value formations within a measuring cycle.
Figure 2B:
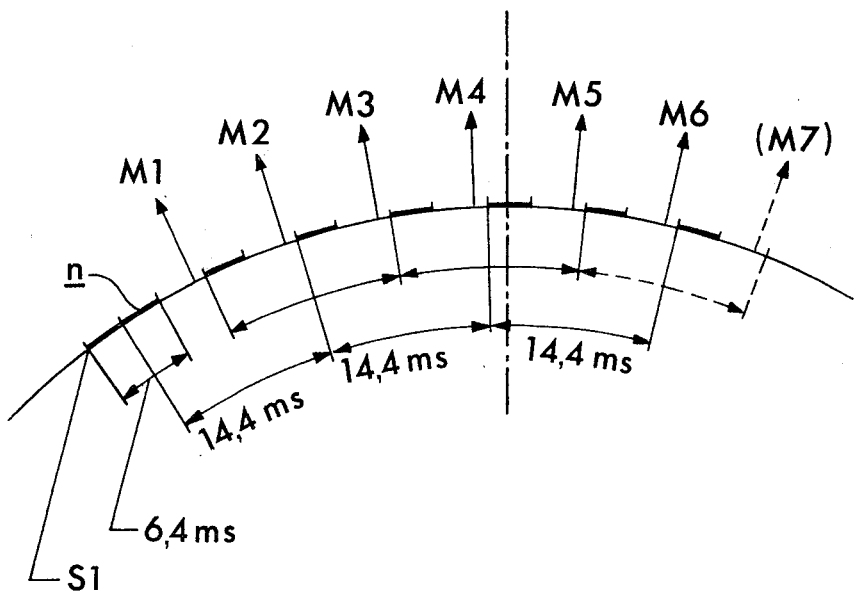
FIG. 2b illustrates the course of all of the measurements and the mean value formations within a measuring cycle, related to a movement of the measured gear teeth.

During the described movement of the feeler 24 there is accomplished the measurements indicated in FIGS. 2a and 2b. These measurements begin at or shortly after that instant in time when the feeler 24 has reached its starting position shown in FIG. 1 with chain-dot or phantom lines. At this moment in time the electronic circuitry illustrated in FIG. 3 recalls a first signal S1 from the moving coil 32. Following this first signal S1 at time intervals of about 0.7 ms, are 9 further signals, so that within a time span of a total of 6.4 ms there have been recalled a first group of a total of 10 signals, which have been delivered by the feeler 24. Thereafter, there is interrupted the recall of the signals for a time span of, for instance, 4 ms according to the illustration of FIG. 2a, and during this time span is formed from the first group of 10 signals a mean value M1 and such mean value is stored. Thereafter, within a time span, which is only half as great as the first-mentioned time span, amounting to therefore 3.2 ms for the illustrated embodiment, there is recalled a second group of a total of five signals. From these five signals as well as the fifth and tenth signal of the first group there is formed a second mean value M2. The second mean value M2 is compared with the first mean value M1, and since the second mean value M2 is greater than the mean value M1, the mean value M2 is stored, preferably at the same storage position by writing-over or eradicating the mean value M1.

In analogous fashion there are recalled further groups of signals and there are formed therefrom mean values M3, M4 and, as only has been illustrated in FIG. 2b, there are formed mean values M5 to M7.

The illustration of FIG. 2b is predicated upon the assumption that each of the newly determined mean values inclusive of the mean value M5 will be greater than each of the previously determined mean values and that the mean value M6 will be the first which is smaller than its predecessor. Accordingly, the mean value M5 constitutes that mean value which most accurately corresponds to the greatest forcing back or rearward displacement of the feeler 24. This mean value is delivered as the decisive measuring value of the relevant measuring cycle in that it is plotted or printed-out by means of a standard graph recorder and/or printer.

The letter n of FIG. 2b indicates that each signal group, which together with the preceding or following signal groups has been used for forming a mean value, can consist in principal of a random number of individual measuring signals. The number of measuring signals of each group can be determined in accordance with the desired measuring accuracy and the oscillation behaviour of the feeler 24.

Now in FIG. 3 there has been illustrated a block circuit diagram of the principal details of electronic circuitry belonging to the measuring device according to the showing of FIG. 1. By means of an appropriate continuous cycle there are thus processed by a measuring system 40 signals S1 to S25 corresponding to those delivered by the moving coil 32. This measuring system 40 ensures that appropriate measuring points will be stored within a measuring point storage or memory 42, in each case after a time interval of 0.7 m/sec. When this storage or memory 42 is filled with 10 measuring points, then a computer 50 accumulates the previously mentioned 10 measuring points and divides the thus accumulated value by the corresponding number of measuring points, i.e. in the present case by 10. Thereafter, the thus determined measuring value is stored in a special measuring value storage 44 and at the same time made available to a measuring value comparator 46. After such first computation the measuring system 40 ensures that five further measuring points will be stored in the measuring point storage 42. These five new measuring points, which are stored in such storage 42, write-over five storage places such that the five previously recorded measuring values still remain available within the storage. From the 10 measuring points which are thus available there is formed a second mean value M2 in the computer 50, namely by accumulation of the 10 measuring values and by division by the factor 10. If the thus formed measuring value M2 is smaller than the value of a prior measurement and which has been stored in the measuring value storage 44, then there is activated a graph recorder 52 and such plots the mean value, available in the measuring value storage, as a decisive measuring or measurement value of the related measuring cycle. The entire course of a measuring cycle is controlled by a program and appropriate data, which is present in a storage or memory 48, by means of the computer 50.

While there are shown and described present preferred embodiments of the invention, it is to be distinctly understood that the invention is not limited thereto, but may be otherwise variously embodied and practiced within the scope of the following claims. Accordingly,

What we claim is:

1. In a method of measuring errors in the truth of rotation of the gear teeth of a gear arising during gear fabrication by means of a measuring device having a feeler guide which is pivotable about a pivot axis extending substantially parallel to the gear axis and guides a feeler which is pre-biased in the direction of the gear, cyclically engages into the gear teeth while the gear rotates, wherein the feeler together with the feeler guide is pivotable about its pivot axis and is displaced back in relation to the feeler guide, there being provided an electronic circuit for determining during each measuring cycle the greatest rearward displacement of the feeler in that it stores signals delivered by the feeler and compares such stored signals with one another, the improvement which comprises the steps of;
    (a) during each measuring cycle forming from a number of signals delivered by the feeler as well as a number of subsequently delivered signals a respective mean value;
    (b) comparing both mean values with one another;
    (c) storing the larger of the mean values provided that it constitutes the mean value formed from the subsequently delivered signal;
    (d) repeating operations (a) to (c) for such length of time until there is formed a mean value which is smaller than the directly precedingly formed mean value; and
    (e) thereafter delivering the precedingly formed mean value as the maximum value of the related measuring cycle.

2. The method as defined in claim 1, further including the steps of:
    forming the first mean value from 2n-signals;
    forming the second mean value from the second half of said 2n-signals as well as from n-subsequent signals;
    forming a third mean value from such n-subsequent signals and further n-signals which constitute still later signals and so forth; and
    wherein, n represents a random number of individual measuring signals.

* * * * *